US012566895B2

(12) United States Patent
Liu et al.

(10) Patent No.: US 12,566,895 B2
(45) Date of Patent: Mar. 3, 2026

(54) METHOD AND APPARATUS FOR DISPLAYING CONTENT, AND COMPUTER DEVICE AND NON-TRANSITORY COMPUTER-READABLE STORAGE MEDIUM

(71) Applicant: GREE ELECTRIC APPLIANCES, INC. OF ZHUHAI, Zhuhai (CN)

(72) Inventors: Rui Liu, Zhuhai (CN); Shangqing Deng, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 163 days.

(21) Appl. No.: 18/547,171

(22) PCT Filed: Nov. 8, 2021

(86) PCT No.: PCT/CN2021/129300
§ 371 (c)(1),
(2) Date: Aug. 21, 2023

(87) PCT Pub. No.: WO2022/199040
PCT Pub. Date: Sep. 29, 2022

(65) Prior Publication Data
US 2024/0320377 A1 Sep. 26, 2024

(30) Foreign Application Priority Data

Mar. 26, 2021 (CN) .......................... 202110323356.9

(51) Int. Cl.
*G06F 21/84* (2013.01)
*G06F 21/32* (2013.01)
(Continued)

(52) U.S. Cl.
CPC .............. *G06F 21/84* (2013.01); *G06F 21/32* (2013.01); *G06F 21/6245* (2013.01); *G06F 3/1446* (2013.01)

(58) Field of Classification Search
CPC ...... G06F 21/84; G06F 21/32; G06F 21/6245; G06F 3/1446; G06F 1/1641;
(Continued)

(56) References Cited

U.S. PATENT DOCUMENTS

2015/0150140 A1* 5/2015 Biswas ................. G06F 1/1652
726/26
2016/0132721 A1* 5/2016 Bostick ................... G06F 21/60
382/118
(Continued)

FOREIGN PATENT DOCUMENTS

CN 104408385 A 3/2015
CN 108121921 A 6/2018
(Continued)

OTHER PUBLICATIONS

International Search Report and Written Opinion issued in corresponding International Patent Application No. PCT/CN2021/129300, with partial Engilsh translation, mailed Jan. 28, 2022, 9 pages.
(Continued)

*Primary Examiner* — Trong H Nguyen
(74) *Attorney, Agent, or Firm* — Armstrong Teasdale LLP

(57) ABSTRACT
The present disclosure relates to the technical field of computers. Provided are a method and apparatus for displaying content, and a computer device and a non-transitory computer-readable storage medium, which are used for effectively improving the safety of private content. The method includes: receiving a private content display operation for a terminal device, wherein private content is the
(Continued)

content, which is added into a set private content set; and in response to the private content display operation, displaying non-private content in a first screen area of the terminal device, and displaying the private content in a second screen area of the terminal device.

16 Claims, 7 Drawing Sheets

(51) Int. Cl.
    *G06F 21/62*         (2013.01)
    *G06F 3/14*         (2006.01)

(58) Field of Classification Search
    CPC .............. G06F 1/1652; G06F 3/04883; G06F 3/04886; G06F 2203/04803; G06F 2221/032; G06F 3/04842; G06F 21/46
    See application file for complete search history.

(56)             References Cited

U.S. PATENT DOCUMENTS

| | | | |
|---|---|---|---|
| 2017/0185808 A1 | 6/2017 | Zhang | |
| 2020/0150915 A1 | 5/2020 | Brown et al. | |
| 2021/0294926 A1* | 9/2021 | Duffy ..................... | G06F 21/84 |
| 2022/0327190 A1* | 10/2022 | Yan ....................... | G06F 1/1652 |
| 2022/0335406 A1* | 10/2022 | Xu ..................... | G06Q 20/3223 |

FOREIGN PATENT DOCUMENTS

| | | | | |
|---|---|---|---|---|
| CN | 108171080 A | 6/2018 | | |
| CN | 109063504 A | 12/2018 | | |
| CN | 109597551 A | 4/2019 | | |
| CN | 109815676 A | 5/2019 | | |
| CN | 110011900 A | 7/2019 | | |
| CN | 110460700 A | 11/2019 | | |
| CN | 111343402 A | 6/2020 | | |
| CN | 112398978 A | 2/2021 | | |
| CN | 112905098 A | 6/2021 | | |
| EP | 2648064 A2 | 10/2013 | | |
| EP | 2648064 B1 * | 12/2019 | ........... | G06F 1/1652 |
| WO | WO-2013132784 A1 * | 9/2013 | ......... | G01C 21/3682 |
| WO | 2020156441 A1 | 8/2020 | | |

OTHER PUBLICATIONS

Search Report for corresponding CN application 2021103233569 dated Jan. 25, 2022.
Search Report for corresponding CN application 2021103233569 dated Apr. 25, 2022.
Supplementary European Search Report for corresponding EP application 21932648 dated Jun. 4, 2024.

* cited by examiner

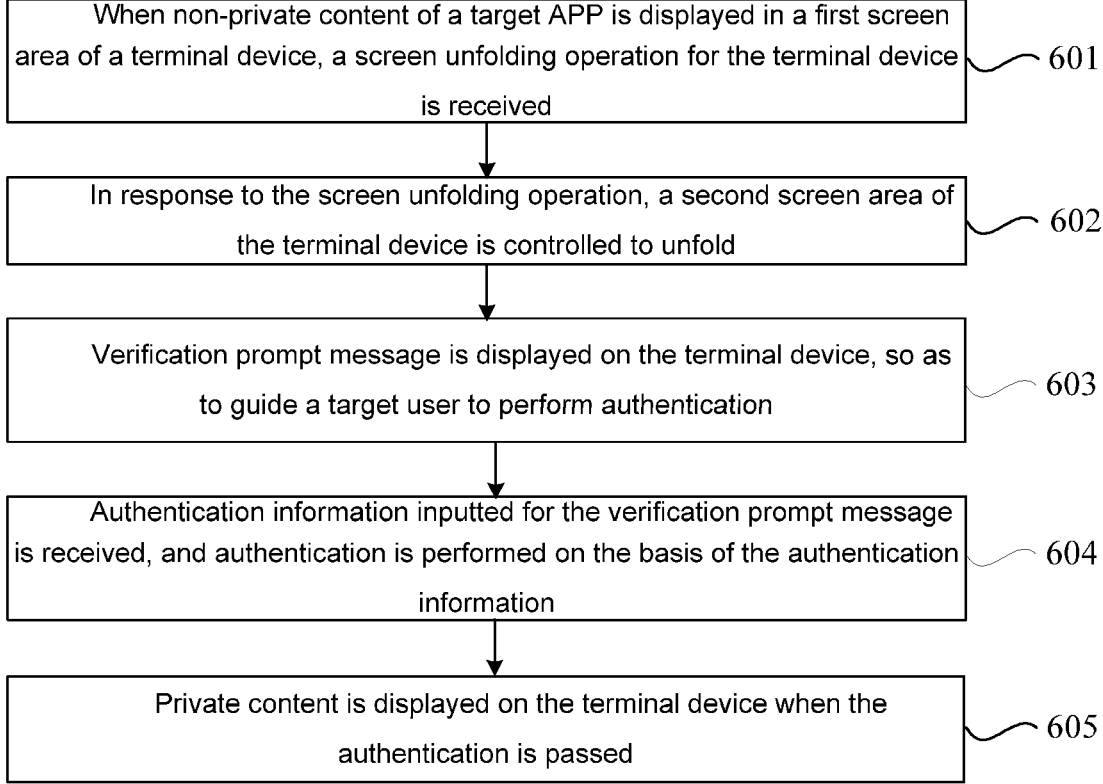

When non-private content of a target APP is displayed in a first screen area of a terminal device, a screen unfolding operation for the terminal device is received — 601

In response to the screen unfolding operation, a second screen area of the terminal device is controlled to unfold — 602

Verification prompt message is displayed on the terminal device, so as to guide a target user to perform authentication — 603

Authentication information inputted for the verification prompt message is received, and authentication is performed on the basis of the authentication information — 604

Private content is displayed on the terminal device when the authentication is passed — 605

Fig. 6

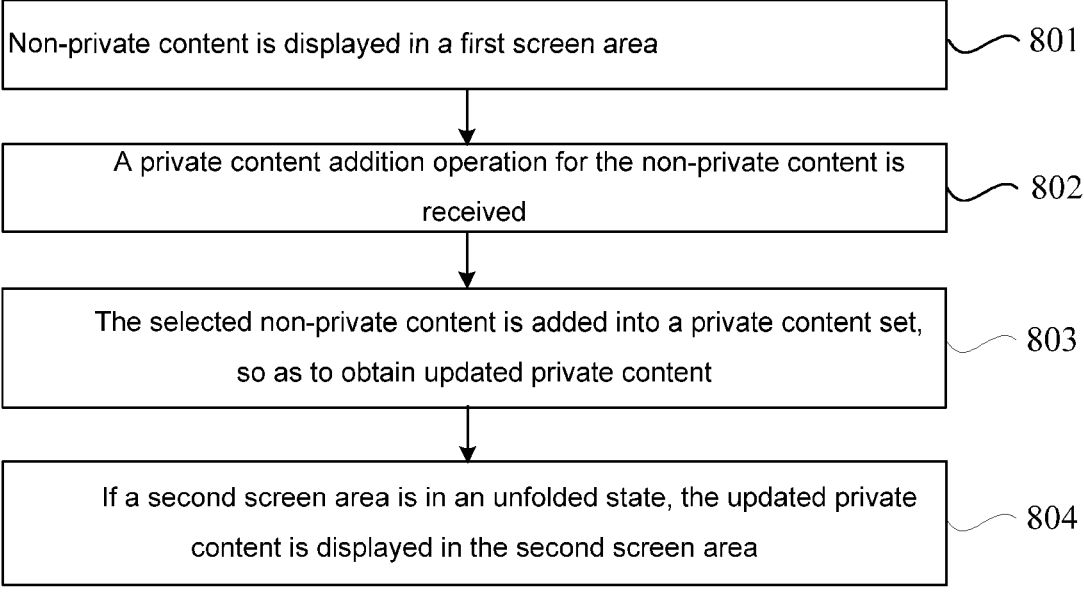

| Non-private content is displayed in a first screen area | 801 |

| A private content addition operation for the non-private content is received | 802 |

| The selected non-private content is added into a private content set, so as to obtain updated private content | 803 |

| If a second screen area is in an unfolded state, the updated private content is displayed in the second screen area | 804 |

Fig. 8

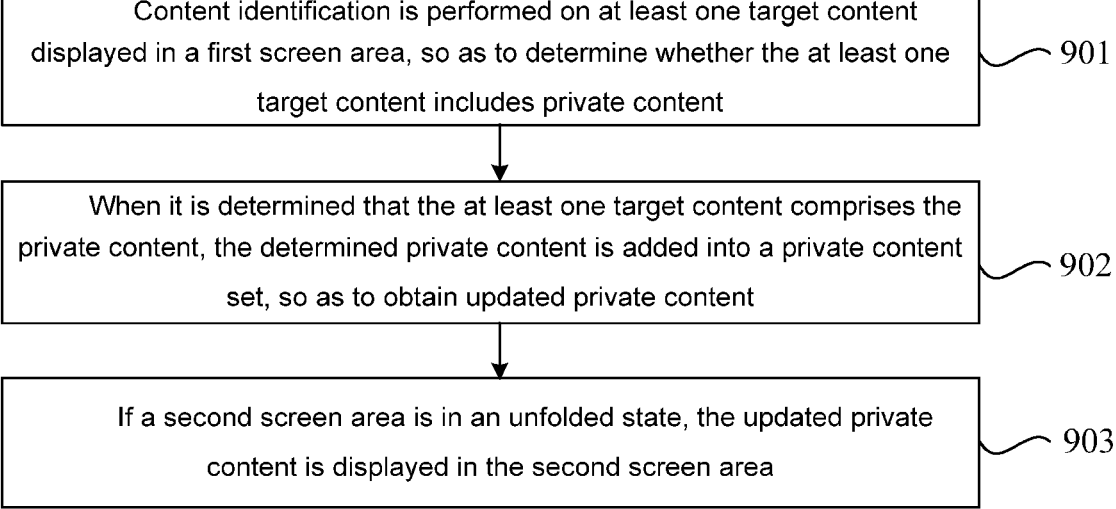

| Content identification is performed on at least one target content displayed in a first screen area, so as to determine whether the at least one target content includes private content | 901 |

| When it is determined that the at least one target content comprises the private content, the determined private content is added into a private content set, so as to obtain updated private content | 902 |

| If a second screen area is in an unfolded state, the updated private content is displayed in the second screen area | 903 |

Fig. 9

METHOD AND APPARATUS FOR DISPLAYING CONTENT, AND COMPUTER DEVICE AND NON-TRANSITORY COMPUTER-READABLE STORAGE MEDIUM

CROSS-REFERENCE TO RELATED APPLICATION

The present application is a National Stage Entry of International Application No. PCT/CN2021/129300, filed Nov. 8, 2021, entitled "CONTENT DISPLAY METHOD AND APPARATUS, AND DEVICE AND STORAGE MEDIUM," which claims the priority of Chinese Patent Application No. 202110323356.9, filed to the China National Intellectual Property Administration on Mar. 26, 2021 and entitled "Method and Apparatus for Displaying Content, and Computer Device and a Non-Transitory Computer-Readable Storage Medium", which are herein incorporated by reference in their entirety.

TECHNICAL FIELD

The present disclosure relates to the technical field of computers, and provides a method and apparatus for displaying content, and computer device and computer storage medium.

BACKGROUND

With the progress of science and technology, mobile terminals are becoming more and more diversified and abundant, among which there is a wide range of the mobile terminals presented in the form of anomalous screens, perforated screens, foldable screens, flexible screens and scroll screens. In addition, since the mobile terminals with large screens are more convenient to operate in terms of browsing webs, watching videos, playing games or documenting and handling official business, the sizes of the screens of the mobile terminals are getting larger and larger, and more and more content may be displayed. Among the above, the scroll screen, which is a typical example, has a large screen size, and the scroll screen extends the mobile phone by means of a pulley bearing, so as to present a larger display space and show more content.

However, regardless of which mobile terminal is based on, all content correspondingly included by Applications (APPs) installed in the mobile terminal is mixed together. For example, when a user wants to check some picture including private content in a picture APP, the user needs to slowly search through hundreds or thousands of images to find the picture, resulting in inconvenience for the searching of the user, such that the use experience of the user is affected, and embarrassing situations when showing and leafing through the pictures to others cannot be avoided.

SUMMARY

Embodiments of the present disclosure provide a method and apparatus for displaying content, and computer device and a non-transitory computer-readable storage medium, which are used for effectively improving the safety of private content.

An aspect provides a method for displaying content. The method includes the following operations:

A private content display operation for a terminal device is received. Private content is the content, which is added into a set private content set.

In response to the private content display operation, non-private content is displayed in a first screen area of the terminal device, and the private content is displayed in a second screen area of the terminal device.

An aspect provides an apparatus for displaying content. The apparatus includes a receiving unit and a first display unit.

The receiving unit is configured to receive a private content display operation for a terminal device. Private content is the content, which is added into a set private content set.

The first display unit is configured to, in response to the private content display operation, display non-private content in a first screen area of the terminal device, and display the private content in a second screen area of the terminal device.

In some implementations, the receiving unit is further configured to perform the following operations:

The private content display operation is received when the non-private content is displayed in both the first screen area and the second screen area.

Alternatively, the private content display operation is received when the second screen area is in a blank screen state.

In some implementations, the first display unit is further configured to perform the following operations.

In response to the private content display operation, the second screen area is controlled to unfold.

The non-private content is displayed in the first screen area, and the private content is displayed in the second screen area.

In some implementations, the apparatus further includes a second display unit and a verification unit.

The second display unit is configured to display verification prompt message on the terminal device, so as to guide a target user to perform authentication.

The verification unit is configured to receive authentication information inputted for the verification prompt message, and perform authentication on the basis of the authentication information.

The first display unit is further configured to display the private content in the second screen area when the authentication is passed.

In some implementations, the verification unit is further configured to perform the following operations.

Password information that is inputted, by the target user, in a password input area included in the verification prompt message is received.

Alternatively, fingerprint information that is inputted, by the target user, in a fingerprint input area included in the verification prompt message is received.

Alternatively, gesture information that is inputted, by the target user, in a gesture input area included in the verification prompt message is received.

Alternatively, receiving human face information that is inputted, by the target user, in a human face input area included in the verification prompt message is received.

Alternatively, speech information that is inputted, by the target user, in a speech input area included in the verification prompt message is received.

In some implementation, the apparatus further includes an unfolding unit.

The unfolding unit is configured to, on the basis of a screen unfolding operation performed for the terminal device, control the second screen area comprised in the terminal device to unfold.

In some implementation, the apparatus further includes an addition unit.

The addition unit is configured to receive a private content addition operation for the non-private content displayed in the first screen area. The private content addition operation is set to set the attribute of the selected non-private content to the private content.

The selected non-private content is added into the private content set, so as to obtain updated private content.

The first display unit is further configured to, if the second screen area is in the unfolded state, display the updated private content in the first screen area in a hiding manner, and display the updated private content in the second screen area.

In some implementations, the apparatus further includes an identification unit.

The identification unit is configured to perform content identification on at least one target content displayed in the first screen area, so as to determine whether the at least one target content comprises the private content.

The addition unit is configured to, when it is determined that the at least one target content comprises the private content, add the determined private content into the private content set, so as to obtain updated private content.

The first display unit is further configured to, if the second screen area is in the unfolded state, display the updated private content in the first screen area in a hiding manner, and display the updated private content in the second screen area.

In some implementations, the identification unit is further configured to perform the following operations.

For each target content, whether each target content includes a set keyword is determined.

The operation of determining that the at least one target content includes the private content includes the following operation.

When there is the target content including the set keyword in the at least one target content, the target content including the set keyword is determined as the private content.

An aspect provides a computer device. The computer device includes a memory, a processor, and a computer program that is stored on the memory and executable on the processor. The processor, when executing the computer program, implements steps of the method described in the above aspects.

An aspect provides a non-transitory computer-readable storage medium. The non-transitory computer-readable storage medium stores a computer program instruction. Steps of the method described in the above aspects are implemented when the computer program instruction is executed by a processor.

In the embodiments of the present disclosure, the terminal device includes the first screen area and the second screen area. When the private content display operation for the terminal device is received, in response to the private content display operation, the non-private content may be displayed in the first screen area of the terminal device, and the private content may be displayed in the second screen area of the terminal device. Therefore, in the embodiments of the present disclosure, the first screen area and the second screen area may respectively display different content of the same APP. The first screen area may display the non-private content of the APP, and the second screen area may display the private content of the APP. When a user wants to check the private content of the current APP, the private content may be displayed in the second screen area, such that the searching efficiency of the private content is accelerated, thereby improving operation convenience. Meanwhile, since the private content and the non-private content may be displayed on separate screens, when content is displayed to others, the second screen area may be closed, or the non-private content is displayed in both the first screen area and the second screen area, so as to prevent the private content from being displayed to others, such that the privacy of the private content is also improved to a certain extent, and the use experience of the user is improved.

In addition, in the embodiments of the present disclosure, when checking the private content in the second screen area, the target user also needs to input corresponding authentication information according to the verification prompt message displayed in the second screen area, so as to verify whether the target user has permission to check the private content, such that the privacy of the user may be greatly guaranteed, embarrassing situations that the private content is seen by others are avoided, and the safety of information is effectively improved.

BRIEF DESCRIPTION OF THE DRAWINGS

In order to more clearly illustrate the technical solutions in the embodiments of the present disclosure or the technical solutions in the related art, the drawings used in the related technical description of the embodiments will be briefly described below. It is apparent that the drawings in the following descriptions are merely the embodiments of the present disclosure. Other drawings may be obtained from those of ordinary skill in the art according to the drawings without any creative work.

FIG. 6 is a schematic flowchart of a content display method according to an embodiment of the present disclosure.

FIG. 8 is a schematic flowchart of a user automatically adding private content according to an embodiment of the present disclosure.

FIG. 9 is a schematic flowchart of automatically identifying and adding private content according to an embodiment of the present disclosure.

DETAILED DESCRIPTION OF THE EMBODIMENTS

Figure 1:
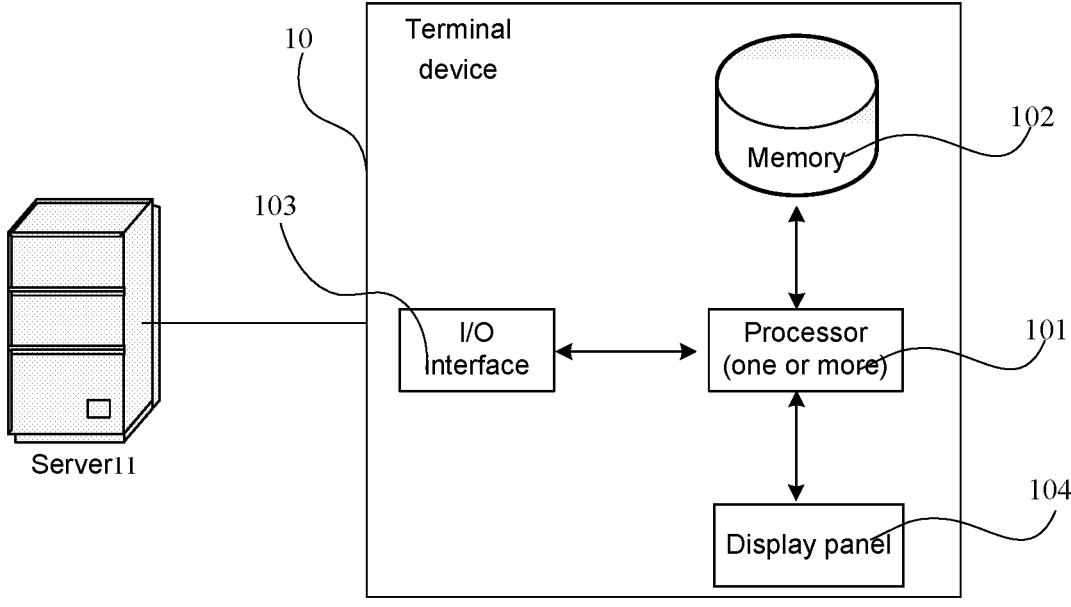
FIG. 1 is a schematic diagram of an application scenario according to an embodiment of the present disclosure.

In order to make objectives, technical solutions, and advantages of the present disclosure clearer, the technical solutions in the embodiments of the present disclosure will be clearly and completely described below in combination with the drawings in the embodiments of the present disclosure. It is apparent that the described embodiments are only part of the embodiments of the present disclosure, not all the embodiments. Based on the embodiments in the present disclosure, all other embodiments obtained by those of ordinary skill in the art without creative work shall fall within the protection scope of the present disclosure. The embodiments in the present disclosure and the features in the embodiments may be randomly combined with one another without conflict. In addition, although a logical sequence is shown in the flowchart, in some cases, the steps shown or described may be executed in a different order than here.

First, some of the terms used in the present disclosure are explained and described.

(1) Non-private content does not involve personal privacy content, and may include public information, for example, content such as "today's weather warning" pushed by a meteorological APP, or "today's hot spots" pushed by a news APP.

(2) Private content is not related to public interest and group interest and the content that a party involved does not want others to know or the content which is inconvenient for others to know. The private content may include content including private vocabularies and content that a user automatically set and does not want to disclose, for example, content of "bank card balance" in a text message APP, content of "personally identifiable information" in a ticketing APP, or content of "bills or amount deposited" in a bank APP, etc.

Currently, regardless of which mobile terminal is based on, content correspondingly included by APPs installed in the mobile terminal is mixed together. For example, when a user wants to check some picture including private content in a picture APP, the user needs to slowly search through hundreds or thousands of images to find the picture, resulting in inconvenience for the searching of the user, such that the use experience of the user is affected, and embarrassing situations when showing and leafing through the pictures to others cannot be avoided.

In addition, when the user lends the mobile terminal, users who use the mobile terminal all may browse private information on the mobile terminal or use private APPs on the mobile terminal, for example, "pictures of salary sheets" and "pictures of job content" of the user in a picture library APP, or "text messages of bank account balance" received by the user in the text message APP, or "bill information" and "amount deposited" of the user in the bank APP, for most of the users, such content may be unwilling to be seen by others. If the content is seen by others, personal privacy information is easily disclosed, and the use safety of the mobile terminal is not effectively guaranteed.

Based on this, according to the method for displaying content provided in the embodiments of the present disclosure, in the method, when the private content display operation for the terminal device is received, in response to the private content display operation, the non-private content may be displayed in the first screen area of the terminal device, and the private content may be displayed in the second screen area of the terminal device. Therefore, in the embodiments of the present disclosure, the first screen area and the second screen area may respectively display different content of the same APP. The first screen area may display the non-private content of the APP, and the second screen area may display the private content of the APP. When a user wants to check the private content of the current APP, the private content may be displayed in the second screen area, such that the searching efficiency of the private content is accelerated, thereby improving operation convenience. Meanwhile, since the private content and the non-private content are displayed on separate screens, when content is displayed to others, the second screen area may be closed, or the non-private content is displayed in both the first screen area and the second screen area, so as to prevent the private content from being displayed to others, such that the privacy of the private content is also improved to a certain extent, and the use experience of the user is improved.

In addition, in the embodiments of the present disclosure, when checking the private content in the second screen area, the target user also needs to input corresponding authentication information according to the verification prompt message displayed in the second screen area, so as to verify whether the target user has permission to check the private content, such that the privacy of the user may be greatly guaranteed, embarrassing situations that the private content is seen by others are avoided, and the safety of information is effectively improved.

After introducing the design ideas of the embodiments of the present disclosure, the following is a brief introduction to the application scenarios to which the technical solutions of the embodiments of the present disclosure can be applied, and it is to be noted that the application scenarios introduced below are only for illustrating the embodiments of the present disclosure and not for limiting the embodiments of the present disclosure. During a specific implementation, the technical solutions provided in the embodiments of the present disclosure may be applied flexibly according to practical requirements.

The technical solutions of the embodiments of the present disclosure may be set in any possible content display scenario. FIG. 1 is a schematic diagram of an application scenario according to an embodiment of the present disclosure. The content display application scenario may include a terminal device 10 and a server 11.

The terminal device 10 may be, for example, any display device including two screen areas, for example, devices such as a mobile phone, a tablet (PAD) or a Personal Computer (PC) with a screen extension display screen. A display screen may be, for example, a foldable screen, a flexible screen, a scroll screen, or the like. A plurality of APPS for information about pictures, text messages, bank statements, and amount deposited may be installed in the terminal device 10.

The server 11 is a backend server corresponding to the APPs, may be an independent physical server, may be a server cluster formed by a plurality of physical servers or a distributed system, or may be a cloud server configured to provide basic cloud computing services such as a cloud service, a cloud database, cloud computing, a cloud function, cloud storage, a network service, cloud communication, a middleware service, a domain name service, a security service, CDN, and a big data and artificial intelligence platform, but is not limited thereto.

The terminal device 10 includes one or more processors 101, a memory 102, and an I/O interface 103 interacting with other devices. In addition, the terminal device 10 may further include a display panel 104. The display panel 104 is configured to show a visualized interaction interface, for example, display information such as pictures, text messages, bank statements, and amount deposited. The memory 102 of the terminal device 10 may store program instructions of the content display method provided in the embodiments of the present disclosure. These program instructions can be used for implementing, when being executed by the processor 101, steps of the content display method provided in the embodiments of the present disclosure.

By using the text message APP as an example, the text message APP not only has text messages for non-private content, but also has text messages for private content; and the user does not want others to check the text messages for private content. Then when the terminal device 10 receives a private content display operation of a user for the terminal device 10, the terminal device 10 responds to the private content display operation, such that the non-private content of the text message APP is displayed in a first screen area of the terminal device 10. For example, a text message for commodity recommendation is displayed in the first screen area. The private content of the text message APP is displayed in a second screen area of the terminal device 10. For example, a notification text message related to the balance of a certain bank account is displayed in the second screen area.

By using a ticketing APP as an example, when traveling with a colleague on a business trip and requiring to purchase a plane ticket for traveling, since the ticket can only be purchased by using ID number information, and ID number information of family numbers may be in the mobile phone of the user and may be used in future, the user needs to save the information in the mobile phone at all time. However, the ID number information is relatively private information, and the user is unwilling to let others to seen such important information easily. Therefore, when the terminal device 10 receives the private content display operation of the user for the terminal device 10, the terminal device 10 responds to the private content display operation, such that the non-private content of the ticketing APP is displayed in the first screen area of the terminal device 10, for example, content such as "current ticketing details". In a page including the ID number information, the specific ID number information is presented as asterisks "*" and displayed in a hiding manner, such that the ID number information cannot be displayed in the first screen area. The private content of the ticketing APP is displayed in the second screen area of the terminal device 10**, for example, the ID number information in the ticketing APP.

Likewise, by using a bank APP as an example, when the user opens the bank APP, content such as credit card repayment information and bills in the bank APP may sometimes be accidentally seen by others, and thus embarrassing situations may occur. Therefore, in order to avoid the occurrence of such situation, the technical solutions provided in the present disclosure may be used. When the terminal device 10 receives the private content display operation of the user for the terminal device 10, the terminal device 10 responds to the private content display operation, such that the non-private content of the bank APP is displayed in the first screen area of the terminal device 10. For the content related to the credit card repayment information and bills, the credit card repayment information may be displayed in a hiding manner by using asterisks, such that the content such as credit card repayment information and bills of the user cannot be displayed in the first screen area. The private content of the bank APP is displayed in the second screen area of the terminal device 10. For example, the content such as credit card repayment information and bills of the user in the bank APP may be checked in the second screen area.

Definitely, the method provided in the embodiments of the present disclosure is not limited to be set in the application scenario shown in FIG. 1, but may also be set in other possible application scenarios, and the embodiments of the present disclosure are not limited thereto. The functions that can be implemented by each device for the application scenario shown in FIG. 1 will be described together in the subsequent method embodiments and will not be described herein again. The method of the embodiments of the present disclosure is introduced below with reference to the drawings.

Figure 2:
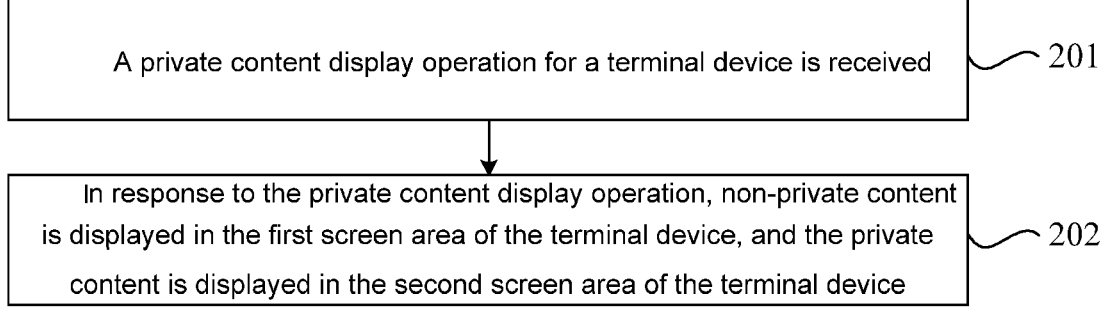
FIG. 2 is a schematic flowchart of a method for displaying content according to an embodiment of the present disclosure.

FIG. 2 is a schematic flowchart of a method for displaying content according to an embodiment of the present disclosure. The method may be executed by means of the terminal device 10 in FIG. 1, and the flow of the method is introduced as follows.

At S201, a private content display operation for a terminal device is received.

In this embodiment of the present disclosure, private content is the content, which is added into a set private content set. For example, by using the text message APP as an example, the notification text message related to personal privacy such as the balance of a certain bank account may be the content in the private content set corresponding to the text message APP.

In this embodiment of the present disclosure, the screen of the terminal device may be in any one of the following several initial states. In different initial states, processes of displaying the private content are also different.

(1) First Initial State

That is, when the second screen area is in an unfolded state, and the non-private content is displayed in both the first screen area and the second screen area, the private content display operation for the terminal device is received.

Figure 3:
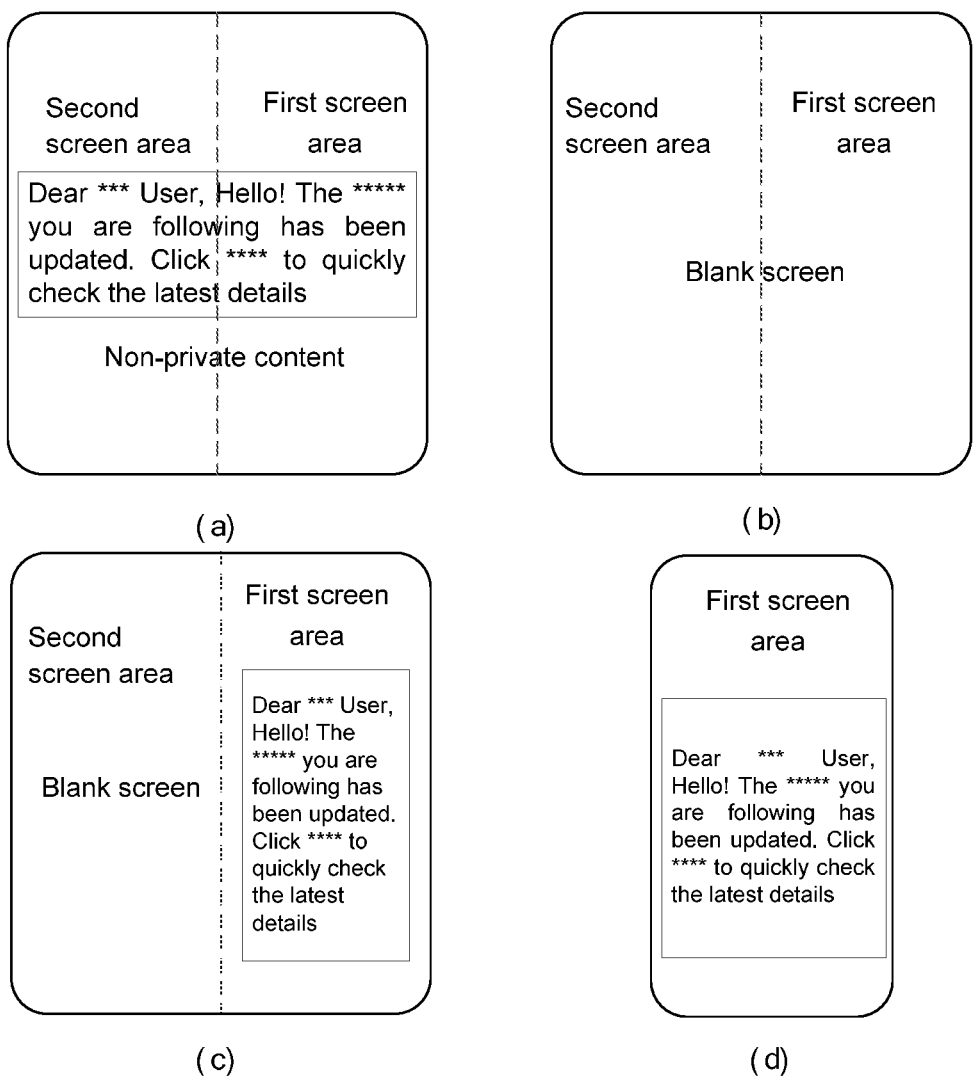
FIG. 3 is a schematic diagram of an initial state of a screen of a terminal device according to an embodiment of the present disclosure.

In this embodiment of the present disclosure, when the second screen area is in the unfolded state, and the non-private content is displayed in both the first screen area and the second screen area, that is, the screen of the terminal device is in a non-screen-splitting state, and the non-private content is displayed in the first screen area and the second screen area together. As shown in (a) in FIG. 3, a schematic diagram of a screen displayed in a non-screen-splitting manner according to an embodiment of the present disclosure, by using the text message APP as an example, when the text message for commodity recommendation in the text message APP is displayed in both the first screen area and the second screen area of the terminal device, the private content display operation for the terminal device is received.

(2) Second Initial State

That is, when the second screen area is in the unfolded state, and the first screen area and the second screen area are both in a blank screen state, the private content display operation for the terminal device is received.

In this embodiment of the present disclosure, when the second screen area is in the unfolded state, and the first screen area and the second screen area are both in the blank screen state, that is, the screen of the terminal device is in the non-screen-splitting state. As shown in (b) in FIG. 3, another schematic diagram of a screen displayed in a non-screen-splitting manner according to an embodiment of the present disclosure, when the entire screen of the terminal device is in the blank screen state, the private content display operation for the terminal device is received.

(3) Third Initial State

That is, when the second screen area is in the unfolded state, the first screen area is in a display state, and the second screen area is in the blank screen state, the private content display operation for the terminal device is received.

In this embodiment of the present disclosure, when the second screen area is in the unfolded state, the first screen area is in the display state, and the second screen area is in the blank screen state, that is, the screen of the terminal device is in a screen-splitting state. As shown in (c) in FIG. 3, a schematic diagram of a screen displayed in a screen-splitting manner according to an embodiment of the present disclosure, also by using the text message APP as an example, when the text message for commodity recommendation is displayed in the first screen area of the terminal device, and the second screen area is in the blank screen state, the private content display operation for the terminal device is received.

(4) Fourth Initial State

That is, when the second screen area is in a folded state, and the first screen area is in the display state, the private content display operation for the terminal device is received.

In this embodiment of the present disclosure, when the second screen area is in the folded state, and the first screen area is in the display state, that is, only the first screen area of the screen of the terminal device may display content. As shown in (d) in FIG. 3, a schematic diagram of a folded screen according to an embodiment of the present disclosure, also by using the text message APP as an example, when the text message for commodity recommendation is displayed in the first screen area, the private content display operation for the terminal device is received.

At S202, in response to the private content display operation, non-private content is displayed in the first screen area of the terminal device, and the private content is displayed in the second screen area of the terminal device.

In this embodiment of the present disclosure, after receiving the private content display operation, the terminal device analyzes the private content display operation, such that, in response to the private content display operation, the non-private content is displayed in the first screen area of the terminal device, and the private content is displayed in the second screen area of the terminal device. For example, by using the text message APP as an example, the text message for commodity recommendation may be displayed in the first screen area, and the notification text message related to the balance of a certain bank account is displayed in the second screen area.

Definitely, according to actual requirements of the user, under a non-screen-splitting situation, the private content may be displayed in the first screen area and the second screen area together; or under a screen-splitting situation, the private content is displayed in the first screen area, and the non-private content is displayed in the second screen area.

The fourth initial state is used as an example for introduction below, that is, situations that the second screen area is in the folded state and the first screen area is in the display state, specific introduction is as follows.

Figure 4:
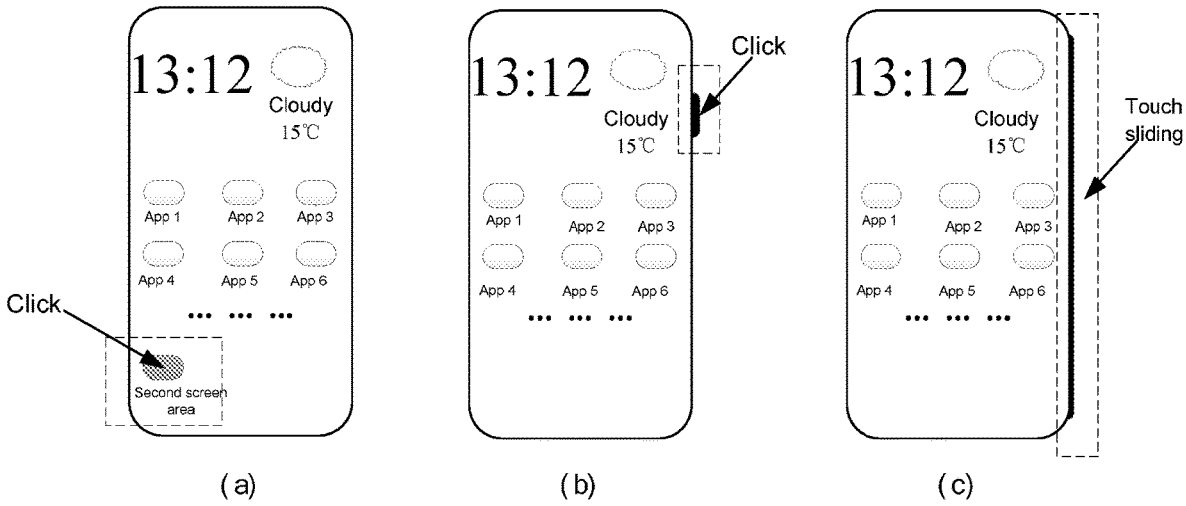
FIG. 4 is a schematic diagram of a manner of opening a second screen area according to an embodiment of the present disclosure.

In this embodiment of the present disclosure, before the content is displayed in the second screen area, the second screen area included by the terminal device is opened on the basis of a screen unfolding operation performed on the terminal device. For example, FIG. 4 is a schematic diagram of a manner of opening a second screen area according to an embodiment of the present disclosure. As shown in (a) in FIG. 4, the screen unfolding operation may be to click a button, in the first screen area, for opening the second screen area; or as shown in (b) in FIG. 4, a physical button for opening the second screen area that is carried by the terminal device is pressed, and the button may be provided on a body side of the terminal device or any other suitable place; or as shown in (c) in FIG. 4, a fingerprint touch-control area of the terminal device is touched in a specific touching manner, so as to open the second screen area; and the fingerprint touch-control gesture area is set to receive the specific touching manner of a target user for the area, so as to determine whether the second screen area is opened, for example, it may be set to slide upward in the fingerprint touch-control gesture area to indicate the unfolding of the second screen area, and to slide downward to indicate the closing of the second screen area. The fingerprint touch-control gesture area may be provided on the body side of the terminal device or any other suitable place.

Definitely, the second screen area may be opened in other possible manners. For example, a certain gesture operation is set to open the second screen area, or the second screen area is directly manually pulled.

Figure 5:
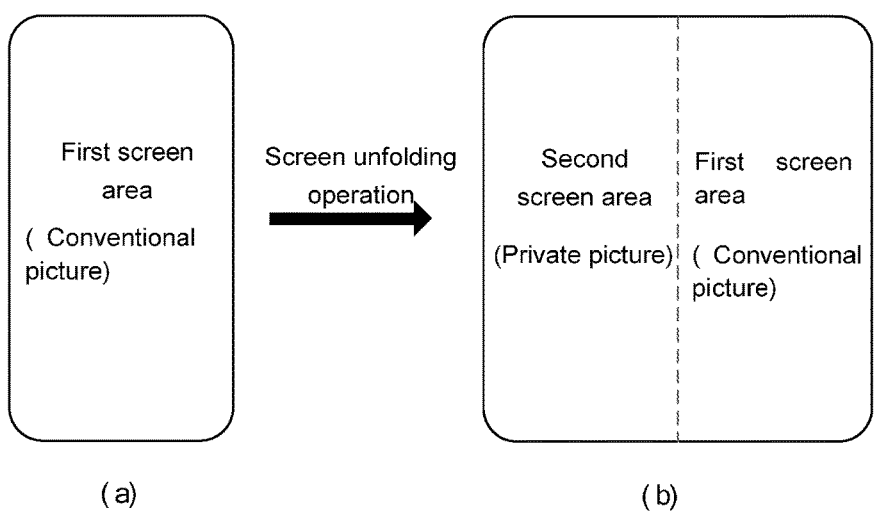
FIG. 5 is a schematic diagram of a displayed picture of a scroll screen mobile phone according to an embodiment of the present disclosure.

Specifically, by using a displayed picture of a scroll screen mobile phone as an example, FIG. 5 is a schematic diagram of a displayed picture of a scroll screen mobile phone according to an embodiment of the present disclosure. When content is conventionally displayed by the scroll screen mobile phone, that is, when the content is only displayed in the first screen area, as shown in (a) in FIG. 5, only a conventional picture is displayed in the first screen area, for example, only displaying content of conventional pictures such as scenery pictures, travel pictures and learning pictures. When the user wants to check pictures related to private content, the user may open the second screen area of the scroll screen mobile phone by means of the screen unfolding operation, such that the scroll screen mobile phone receives the screen unfolding operation for the scroll screen mobile phone.

In this embodiment of the present disclosure, also by using the displayed picture of the scroll screen mobile phone as an example, after the scroll screen mobile phone unfolds the second screen area, according to a received first operation for the scroll screen mobile phone, the scroll screen mobile phone analyzes the first operation, and displays, according to analyzed content, the private content in a target APP that differs from the non-private content in the unfolded second screen area. Therefore, in response to the first operation, the scroll screen mobile phone displays, according to the analyzed content obtained by analyzing the first operation, the private content in the target APP that differs from the non-private content in the unfolded second screen area. As shown in (b) in FIG. 5, the conventional pictures may be displayed in the first screen area, and private pictures may be displayed in the second screen area.

In a possible implementation, in order to improve the safety of the private content, when the target user checks the private content, authentication may be performed on the user. FIG. 6 is a schematic flowchart of a content display method according to an embodiment of the present disclosure. In FIG. 6, specifically, the fourth initial state is used as an example for introduction below, the remaining initial states may also refer the following method flows, and thus, details are not described herein again.

At S601, when the non-private content of the target APP is displayed in the first screen area of the terminal device, the screen unfolding operation for the terminal device is received.

In this embodiment of the present disclosure, by using the displayed picture of the scroll screen mobile phone as an example, when the content is only displayed in the first screen area of the terminal device, as shown in (a) in FIG. 5, and when the conventional pictures are only displayed in the first screen area, the screen unfolding operation of the target user for the scroll screen mobile phone is received. As shown in FIG. 4, an operation of clicking the button, in the first screen area, for opening the second screen area is received, or an operation of clicking a hardware button for opening the second screen area that is carried by the scroll screen mobile phone is received, or an operation of touching the fingerprint touch-control gesture area of the terminal device by means of a specific gesture so as to open the second screen area is received.

At S602, in response to the screen unfolding operation, the second screen area of the terminal device is controlled to unfold.

Specifically, also by using the displayed picture of the scroll screen mobile phone as an example, after the scroll screen mobile phone receives the screen unfolding operation for the scroll screen mobile phone, the scroll screen mobile phone analyzes the screen unfolding operation, and learns, according to the analyzed content, that the second screen area needs to be unfolded.

At S603, verification prompt message is displayed on the terminal device, so as to guide the target user to perform authentication.

In this embodiment of the present disclosure, in order to improve the safety of the private content, the user may be required to perform safety verification.

In a possible implementation, the user may be required to perform safety verification after the second screen area is unfolded and before the private content is displayed in the second screen area. Then, the displayed verification prompt message may be displayed in the first screen area or the second screen area, or may be displayed in full screen.

In another possible implementation, the verification prompt message may be displayed in the first screen area after the screen unfolding operation is received, and before the second screen area is unfolded.

At S604, authentication information inputted for the verification prompt message is received, and authentication is performed on the basis of the authentication information.

In this embodiment of the present disclosure, after receiving the authentication information for the verification prompt message, the terminal device compares the inputted authentication information with corresponding authentication information prestored in the terminal device, so as to verify whether the corresponding authentication information inputted by the target user is correct.

Figure 7:
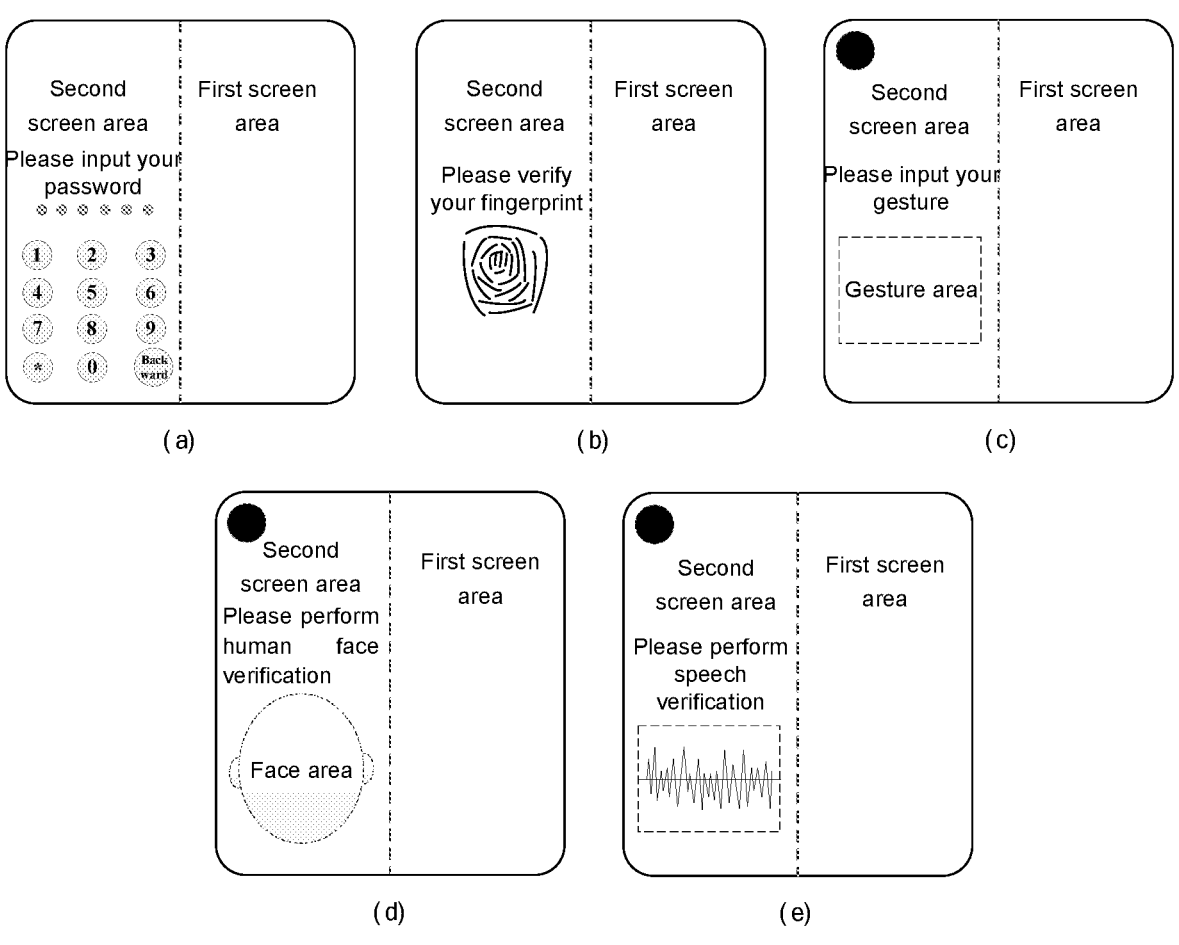
FIG. 7 is a schematic diagram of authentication according to an embodiment of the present disclosure.

For example, FIG. 7 is a schematic diagram of authentication according to an embodiment of the present disclosure. User authentication may be performed in various manners. In FIG. 7, specific introduction is performed by using the verification prompt message displayed in the second screen area after the second screen area is unfolded, and the remaining manners of displaying the verification prompt message may also refer to the following method flow, such that details are not described herein again.

(1) A Manner of Password Verification

The user may set, in the target APP in advance, a password for checking the private content, and may open password verification required for checking the private content. Then, after the second screen area is unfolded, a verification interface shown in (a) in FIG. 7 may be shown, that is, the verification prompt information of "please input your password" is displayed in the verification interface.

Correspondingly, the user may input and confirm his/her own password in a corresponding password input box. For example, the password may be a digital password such as "123456", then password verification is performed, and the authentication is passed when the input password is the same as a preset password. (2) A manner of fingerprint verification The user may set, in the target APP in advance, a fingerprint for checking the private content, and may open fingerprint verification required for checking the private content. Then, after the second screen area is unfolded, a verification interface shown in (a) in FIG. 7 may be shown, that is, the verification prompt information of "please enter your fingerprint" is displayed in the verification interface. Correspondingly, the user may enter and confirm his/her own fingerprint in a corresponding fingerprint identification area. For example, the fingerprint may be a fingerprint of "the left thumb" of the user, then fingerprint verification is entered, and the authentication is passed when the input fingerprint is the same as a preset fingerprint. (3) A manner of gesture verification The user may set, in the target APP in advance, a gesture for checking the private content, and may open gesture verification required for checking the private content. Then, after the second screen area is unfolded, a verification interface shown in (c) in FIG. 7 may be shown, that is, the verification prompt information of "please input your gesture" is displayed in the verification interface. Correspondingly, the user may input and confirm his/her own gesture in a corresponding gesture input box, then gesture verification is performed, and the authentication is passed when the input gesture is the same as a preset gesture.

(4) A Manner of Human Face Verification

The user may set, in the target APP in advance, a profile photo for checking the private content, and may open human face verification required for checking the private content. Then, after the second screen area is unfolded, a verification interface shown in (c) in FIG. 7 may be shown, that is, the verification prompt information of "please input your face" is displayed in the verification interface. Correspondingly, the user may input and confirm his/her own face in a corresponding face input box, then profile photo verification is performed, and the authentication is passed when the input profile photo is the same as a preset profile photo.

(5) A Manner of Speech Verification

The user may set, in the target APP in advance, a speech for checking the private content, and may open speech verification required for checking the private content. Then, after the second screen area is unfolded, a verification interface shown in (e) in FIG. 7 may be shown, that is, the verification prompt information of "please input your speech" is displayed in the verification interface. Correspondingly, the user may input and confirm his/her own speech in a corresponding speech input box, then speech verification is performed, and the authentication is passed when the input speech is the same as a preset speech feature.

At S505, the private content is displayed in the second screen area when the authentication is passed.

In this embodiment of the present disclosure, when the corresponding authentication information inputted by the target user is verified to be correct, that is, the authentication of the target user is passed, the private content may be displayed on the terminal device.

In a possible implementation, if the authentication of the target user is passed, the corresponding private content may be displayed in the first screen area and the second screen area together in a non-screen-splitting manner.

In another possible implementation, if the authentication of the target user is passed, in a screen-splitting manner, the non-private content may be displayed in the first screen area, and the corresponding private content may be displayed in the second screen area.

However, if the corresponding authentication information inputted by the target user is verified to be incorrect, that is, when the authentication of the target user is not passed, content such as "re-authentication" or "change authentication mode" may be displayed in the second screen area. In some implementations, if the authentication is still not passed within the set number of times, the target user cannot check the private content in the second screen area.

In this embodiment of the present disclosure, each APP corresponds to one private content set, and the private content set includes all private content of the corresponding APP.

In a possible implementation, each private content in the private content set may be set by the user. FIG. 8 is a schematic flowchart of a user automatically adding private content according to an embodiment of the present disclosure. The fourth initial state is used as an example for introduction below, the remaining initial states may also refer the following method flows, and thus, details are not described herein again.

At S801, the non-private content is displayed in the first screen area.

In this embodiment of the present disclosure, the non-private content displayed in the first screen area may be updated content received by the target APP; or the non-private content displayed in the first screen area may also be the content of the target APP that is originally displayed in the first screen area.

By using the received updated content as an example, when the updated content is received by the target APP, the attribute of the updated content may be the non-private content by default, such that the non-private content may be displayed in the first screen area.

For example, the target APP is a text message APP, when the an updated text message is received by the text message APP, the attribute of the updated text message may be the non-private content by default, such that the newly-received text message may be displayed in the first screen area.

At S802, a private content addition operation for the non-private content is received.

In this embodiment of the present disclosure, when the non-private content involves personal privacy, the user does not want other to see at will, and then the user may perform private content addition operation on the non-private content. The private content addition operation is set to set the attribute of selected non-private content as the private content. Therefore, the user may add the selected non-private content into the private content set, and correspondingly, the terminal device may receive the private content addition operation of the user.

Likewise, for example, the target APP is the text message APP, when the target user determines that the text message newly received by the target APP is a text message related to the private content, the target user performs the private content addition operation on the new text message. For example, when the target user determines that the text message is the private content, the private content addition operation may be performed on the non-private content. For example, if the new text message includes information about bank card balance or personal information including the target user, the target user may perform the private content addition operation. For example, the private content addition operation may include pressing the new text message for 2 seconds or a specific gesture operation, and then selecting an icon of "set as privacy" in a selection menu bar.

At S803, the selected non-private content is added into the private content set, so as to obtain updated private content.

In this embodiment of the present disclosure, after the target user performs the private content addition operation on the selected non-private content, the selected non-private content may be added into the private content set on the basis of the private content addition operation, so as to obtain the updated private content. Likewise, for example, the target APP is the text message APP, the terminal device adds the newly-received text message into the private content set corresponding to the text message APP, such that updated text message private content may be obtained.

At S804, if the second screen area is in the unfolded state, the updated private content is displayed in the second screen area.

In this embodiment of the present disclosure, if the second screen area is in the unfolded state, the updated private content may be displayed in the second screen area. For example, after the newly-received text message is added into the private content set of the corresponding text message APP, and when the second screen area is in the unfolded state, the newly-received text message may be displayed by moving from the first screen area to the second screen area.

In a possible implementation, the private content may also be added by means of automatic identification addition. FIG. 9 is a schematic flowchart of automatically identifying and adding private content according to an embodiment of the present disclosure. The fourth initial state is used as an example for introduction below, the remaining initial states may also refer the following method flows, and thus, details are not described herein again.

At S901, content identification is performed on at least one target content displayed in the first screen area, so as to determine whether the at least one target content includes the private content.

In this embodiment of the present disclosure, the at least one target content displayed in the first screen area may be updated content received by the target APP; or the at least one target content displayed in the first screen area may also be the content of the target APP that is originally displayed in the first screen area.

In this embodiment of the present disclosure, an intelligent determination plug-in installed in the terminal device may be used to determine whether the at least one target content displayed in the first screen area includes the private content. The intelligent determination plug-in is embedded in an operating system of the terminal device.

In a possible implementation, the intelligent determination plug-in may identify that whether the at least one target content displayed in the first screen area includes a preset keyword; and the keyword may be a default keyword by the intelligent determination plug-in, or may be a keyword added by the user.

For example, for the text message APP, content related to money or personal information may be set as a keyword, for example, content such as "ID numbers" and "login account number"; for the bank APP, content related to bill information or deposit information may be set as a keyword, for example, content such as "consumption in current month" and "current balance"; and for the ticketing APP, content related to ticketing records may be set as a keyword, for example, content such as "the number of ticketing".

When the intelligent determination plug-in identifies that the text message newly received by the text message APP includes the set keyword, it is determined that the newly-received text message is the private content. Likewise, when the intelligent determination plug-in identifies that the content of the bank APP or the ticketing APP is changed, and the changed content includes the set keyword, it is determined that the changed content is the private content.

In another possible implementation, the intelligent determination plug-in may further use a pre-trained private content determination model to perform content identification on the at least one target content displayed in the first screen area. The private content determination model may be any possible deep neural network model.

At S902, when it is determined that the at least one target content comprises the private content, the determined private content is added into the private content set, so as to obtain updated private content.

In this embodiment of the present disclosure, after the intelligent determination plug-in included in the terminal device determines that the emerging content is the private content, the intelligent determination plug-in adds the emerging content into the private content set. For example, the private content of the ticketing APP is added into the private content set corresponding to the ticketing APP, such that updated ticketing APP private content may be obtained.

At S903, if the second screen area is in the unfolded state, the updated private content is displayed in the second screen area.

In this embodiment of the present disclosure, if the second screen area is in the unfolded state, the updated private content may be displayed in the second screen area. For example, after the newly-received text message is added into the private content set of the corresponding text message APP, and when the second screen area is in the unfolded state, the newly-received text message may be displayed by moving from the first screen area to the second screen area.

To sum up, in the embodiments of the present disclosure, the first screen area and the second screen area may respectively display different content of the same APP. The first screen area may display the non-private content of the APP, and the second screen area may display the private content of the APP. When a user wants to check the private content of the current APP, the private content may be displayed in the second screen area, such that the searching efficiency of the private content is accelerated, thereby improving operation convenience. In addition, when checking the private content in the second screen area, the target user also needs to input corresponding authentication information according to the verification prompt information displayed in the second screen area, so as to verify whether the target user has permission to check the private content, such that the privacy of the user may be greatly guaranteed, embarrassing situations that the private content is seen by others are avoided, and the safety of information is effectively improved.

Figure 10:
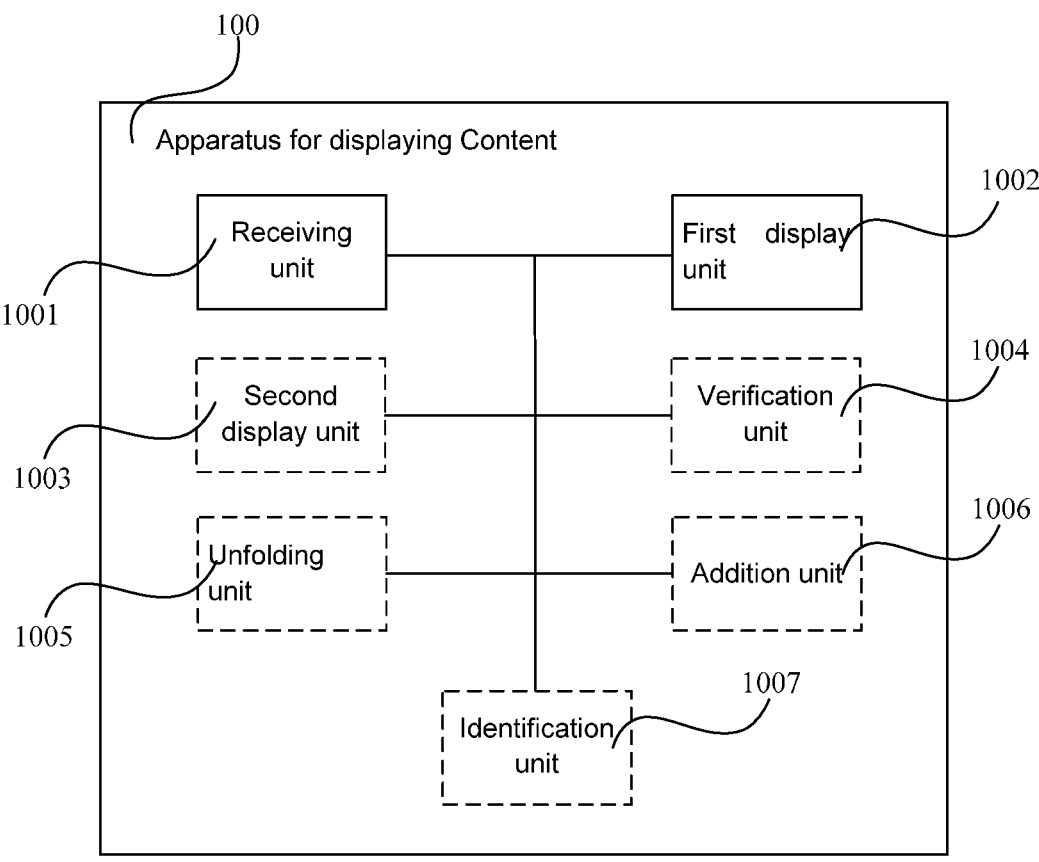
FIG. 10 is an apparatus for displaying content according to an embodiment of the present disclosure.

As shown in FIG. 10, based on the same inventive concept, an embodiment of the present disclosure provides an apparatus for displaying content 100. The apparatus includes a receiving unit and a first display unit.

The receiving unit 1001 is configured to receive a private content display operation for a terminal device. Private content is the content, which is added into a set private content set.

The first display unit 1002 is configured to, in response to the private content display operation, display non-private content in a first screen area of the terminal device, and display the private content in a second screen area of the terminal device.

In some implementations, the receiving unit 1001 is further configured to perform the following operations.

The private content display operation is received when the non-private content is displayed in both the first screen area and the second screen area.

Alternatively, the private content display operation is received when the second screen area is in a blank screen state.

In some implementations, the first display unit 1002 is further configured to perform the following operations.

In response to the private content display operation, the second screen area is controlled to unfold.

The non-private content is displayed in the first screen area, and the private content is displayed in the second screen area.

In some implementations, the apparatus 100 further includes a second display unit and a verification unit.

The second display unit 1003 is configured to display verification prompt message on the terminal device, so as to guide a target user to perform authentication.

The verification unit 1004 is configured to receive authentication information inputted for the verification prompt message, and perform authentication on the basis of the authentication information.

The first display unit 1002 is further configured to display the private content in the second screen area when the authentication is passed.

In some implementations, the verification unit 1004 is further configured to perform the following operations.

Password information that is inputted, by the target user, in a password input area included in the verification prompt message is received.

Alternatively, fingerprint information that is inputted, by the target user, in a fingerprint input area included in the verification prompt message is received.

Alternatively, gesture information that is inputted, by the target user, in a gesture input area included in the verification prompt message is received.

Alternatively, receiving human face information that is inputted, by the target user, in a human face input area included in the verification prompt message is received.

Alternatively, speech information that is inputted, by the target user, in a speech input area included in the verification prompt message is received.

In some implementations, the apparatus 100 further includes an unfolding unit.

The unfolding unit 1005 is configured to, on the basis of a screen unfolding operation performed for the terminal device, control the second screen area comprised in the terminal device to unfold.

In some implementations, the apparatus 100 further includes an addition unit.

The addition unit 1006 is configured to receive a private content addition operation for the non-private content displayed in the first screen area. The private content addition operation is set to set the attribute of the selected non-private content to the private content.

The selected non-private content is added into the private content set, so as to obtain updated private content.

The first display unit 1002 is further configured to, if the second screen area is in the unfolded state, display the updated private content in the first screen area in a hiding manner, and display the updated private content in the second screen area.

In some implementations, the apparatus 100 further includes an identification unit, an addition unit and a first display unit.

The identification unit 1007 is configured to perform content identification on at least one target content displayed in the first screen area, so as to determine whether the at least one target content comprises the private content.

The addition unit 1006 is configured to, when it is determined that the at least one target content comprises the private content, add the determined private content into the private content set, so as to obtain updated private content.

The first display unit 1002 is further configured to, if the second screen area is in the unfolded state, display the updated private content in the first screen area in a hiding manner, and display the updated private content in the second screen area.

In some implementations, the identification unit 1007 is further configured to perform the following operation.

For each target content, whether each target content includes the private content is determined.

The operation of determining that the at least one target content includes the private content includes the following operation.

When there is the target content including the set keyword in the at least one target content, the target content including the set keyword is determined as the private content.

The apparatus may be configured to execute the method described in the embodiments shown in FIG. 2 to FIG. 9. Therefore, functions that can be implemented by each functional module of the apparatus may refer to the description of the embodiments shown in FIG. 2 to FIG. 9, such that details are not described again. In FIG. 10, the second display unit 1003, the verification unit 1004, the unfolding unit 1005, the addition unit 1006 and the identification unit 1007 are not mandatory functional units, and thus shown in FIG. 10 with dotted lines.

Figure 11:
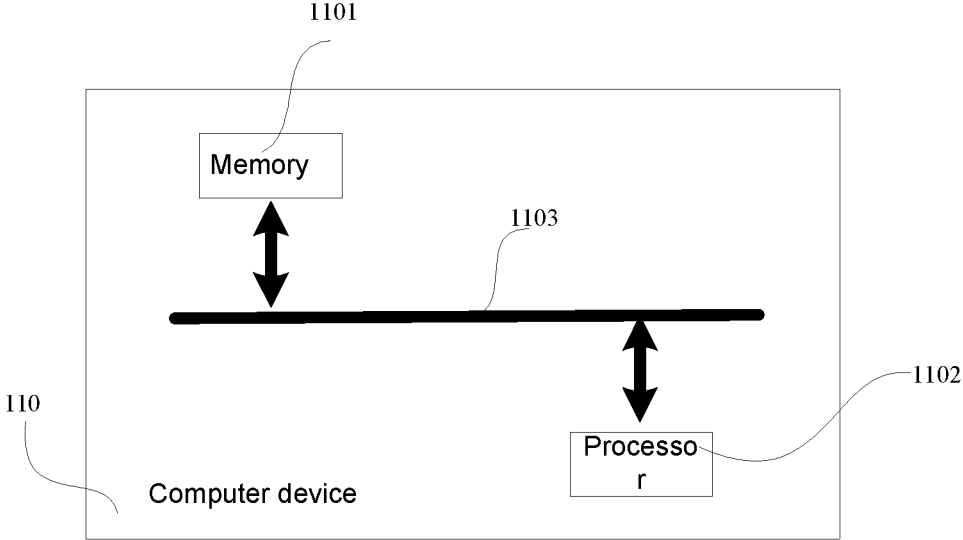
FIG. 11 is a schematic diagram of a computer device according to an embodiment of the present disclosure.

Referring to FIG. 11, based on the same inventive concept, an embodiment of the present disclosure further provides a computer device 110. The computer device may include a memory 1101 and a processor 1102.

The memory 1101 is configured to store a computer program executed by the processor 1102. The memory 1101 may mainly include a program storage area and a data storage area. The program storage area may store an operating system and an application program required for at least one function. The data storage area may store data created according to use of the computer device. The processor 1102 may be a Central Processing Unit (CPU), or a digital processing unit, etc. In this embodiment of the present disclosure, a specific connection medium between the memory 1101 and the processor 1102 is not limited. In this embodiment of the present disclosure, in FIG. 11, the memory 1101 and the processor 1102 are connected by means of a bus 1103; the bus 1103 is shown as a thick line in FIG. 11; and the other components are connected in a way that is only schematically illustrated and not cited as a limitation. The bus 1103 may be divided into an address bus, a data bus, a control bus, and the like. For ease of presentation, only one thick line is used in FIG. 11, but it does not mean that there is only one bus or one type of buses.

The memory 1101 may be a volatile memory, such as a Random-Access Memory (RAM); the memory 1101 may also be a non-volatile memory, such as a read-only memory, a flash memory, a Hard Disk Drive (HDD) or a Solid-State Drive (SSD); alternatively, the memory 1101 is any other medium capable of being configured to carry or store a desired program code in the form of instructions or data structures and capable of being accessed by a computer, but is not limited thereto. The memory 1101 may be a combination of the above memories.

The processor 1102 is configured to execute, when calling the computer program stored in the memory 1101, the method executed by the device in the embodiments shown in FIG. 2 to FIG. 9.

In some possible implementations, each aspect of the method provided in the present disclosure may also be implemented as the form of a program product, which includes a program code. When the program product is operated on a computer device, the program code is set to cause the computer device to execute steps in the method according to various exemplary implementations of the present disclosure described above in this specification. For example, the computer device may execute the method described in the embodiments shown in FIG. 2 to FIG. 9.

Those of ordinary skill in the art should know that all or part of the steps of the method embodiment may be implemented by related hardware instructed through a program, the program may be stored in a computer-readable storage medium, and the program is executed to execute the steps of the method embodiment. The storage medium which may be a volatile storage medium includes: a mobile storage device, a Read-Only Memory (ROM), a Random Access Memory (RAM) and various media that can store program codes, such as a magnetic disk, or an optical disk. If the integrated unit is implemented in the form of the software functional unit and sold or used as an independent product, it may be stored in the computer readable storage medium. Based on such an understanding, the technical solutions of the embodiments of the disclosure substantially or parts making contributions to the related art may be embodied in form of a software product, and the computer software product is stored in a storage medium, including a plurality of instructions for causing a computer device (which may be a personal computer, a server, a network device or the like) to execute all or part of the method in each embodiment of the disclosure. The foregoing storage medium includes a portable storage device, an ROM, an RAM, and various media that may store program codes, such as a magnetic disk, or an optical disk.

Although the preferred embodiments of the present disclosure have been described, those skilled in the art may make additional changes and modifications to these embodiments once the underlying creative concepts are known. Therefore, the appended claims are intended to be construed to include the preferred embodiments and all changes and modifications that fall within the scope of the present disclosure.

It is apparent that those skilled in the art may make various modifications and variations to the present disclosure without departing from the spirit and scope of the present disclosure. Therefore, if such modifications and variations of the present disclosure fall within the scope of the appended claims and their equivalents, the present disclosure is also intended to cover the modifications and variations.

What is claimed is:

1. A method for displaying content, comprising:

receiving a private content display operation for a terminal device, wherein private content of the private content display operation is content, which is added into a set private content set; and in response to the private content display operation, displaying non-private content in a first screen area of the terminal device, and displaying the private content in a second screen area of the terminal device, wherein responsive to determining that the second screen area is in an unfolded state, the receiving the private content display operation for the terminal device comprises:

receiving the private content display operation responsive to determining that the non-private content is displayed in both the first screen area and the second screen area; or receiving the private content display operation responsive to determining that the second screen area is in a blank screen state, wherein the method further comprises: responsive to determining that an authentication of a target user is passed, displaying a corresponding private content in the first screen area and the second screen area together in a non-screen-splitting manner.

2. The method according to claim 1, wherein responsive to determining that the second screen area is in a folded state, in response to the private content display operation, displaying the non-private content in the first screen area of the terminal device, and displaying the private content in the second screen area of the terminal device comprises:

in response to the private content display operation, controlling the second screen area to unfold; and displaying the non-private content in the first screen area, and displaying the private content in the second screen area.

3. The method according to claim 2, wherein before the receiving the private content display operation for the terminal device, the method comprises:

according to a screen unfolding operation performed for the terminal device, controlling the second screen area comprised in the terminal device to unfold.

4. The method according to claim 1, wherein before the private content is displayed in the second screen area of the terminal device, the method comprises:

displaying a verification prompt message on the terminal device, so as to guide the target user to perform authentication; and receiving authentication information inputted for the verification prompt message, and performing authentication on the basis of the authentication information; and wherein the displaying the private content in the second screen area of the terminal device comprises:

displaying the private content in the second screen area responsive to determining that the authentication of the target user is passed.

5. The method according to claim 4, wherein the receiving authentication information inputted for the verification prompt message comprises:

receiving password information that is inputted, by the target user, in a password input area comprised in the verification prompt message; or receiving fingerprint information that is inputted, by the target user, in a fingerprint input area comprised in the verification prompt message; or receiving gesture information that is inputted, by the target user, in a gesture input area comprised in the verification prompt message; or receiving human face information that is inputted, by the target user, in a human face input area comprised in the verification prompt message; or receiving speech information that is inputted, by the target user, in a speech input area comprised in the verification prompt message.

6. The method according to claim 1, wherein the method comprises:

receiving a private content addition operation for the non-private content displayed in the first screen area, wherein the private content addition operation is set to set an attribute of a selected non-private content to the private content;

adding the selected non-private content into the private content set, so as to obtain updated private content; and responsive to determining that the second screen area is in an unfolded state, displaying the updated private content in the first screen area in a hiding manner, and displaying the updated private content in the second screen area.

7. The method according to claim 1, wherein the method comprises:

performing content identification on at least one target content displayed in the first screen area, so as to determine whether the at least one target content comprises the private content;

responsive to determining that the at least one target content comprises the private content, adding the determined private content into the private content set, so as to obtain updated private content; and responsive to determining that the second screen area is in an unfolded state, displaying the updated private content in the first screen area in a hiding manner, and displaying the updated private content in the second screen area.

8. The method according to claim 7, wherein the performing content identification on the at least one target content displayed in the first screen area, so as to determine whether the at least one target content comprises the private content comprises:

determining, for each of the at least one target content, whether each of the at least one target content comprises a set keyword; and wherein the determining whether the at least one target content comprises the private content comprises:

responsive to determining that the at least one target content comprises the set keyword, determining the at least one target content comprising the set keyword as the private content.

9. A computer device, comprising a memory, a processor, and a computer program which is stored in the memory and executable on the processor, wherein the processor, when executing the computer program, executes a method for displaying content, wherein the method comprises:

receiving a private content display operation for a terminal device, wherein private content of the private content display operation is content, which is added into a set private content set; and in response to the private content display operation, displaying non-private content in a first screen area of the terminal device, and displaying the private content in a second screen area of the terminal device, wherein responsive to determining that the second screen area is in an unfolded state, the receiving the private content display operation for the terminal device comprises:

receiving the private content display operation responsive to determining that the non-private content is displayed in both the first screen area and the second screen area; or receiving the private content display operation responsive to determining that the second screen area is in a blank screen state, wherein the method further comprises: responsive to determining that an authentication of a target user is passed, displaying a corresponding private content in the first screen area and the second screen area together in a non-screen-splitting manner.

10. The computer device according to claim 9, wherein responsive to determining that the second screen area is in a folded state, in response to the private content display operation, displaying the non-private content in the first screen area of the terminal device, and displaying the private content in the second screen area of the terminal device comprises:

in response to the private content display operation, controlling the second screen area to unfold; and displaying the non-private content in the first screen area, and displaying the private content in the second screen area.

11. The computer device according to claim 10, wherein before the receiving the private content display operation for the terminal device, the method comprises:

according to a screen unfolding operation performed for the terminal device, controlling the second screen area comprised in the terminal device to unfold.

12. The computer device according to claim 9, wherein before the private content is displayed in the second screen area of the terminal device, the method comprises:

displaying a verification prompt message on the terminal device, so as to guide the target user to perform authentication; and receiving authentication information inputted for the verification prompt message, and performing authentication on the basis of the authentication information; and wherein the displaying the private content in the second screen area of the terminal device comprises:

displaying the private content in the second screen area responsive to determining that the authentication of the target user is passed.

13. The computer device according to claim 12, wherein the receiving authentication information inputted for the verification prompt message comprises:

receiving password information that is inputted, by the target user, in a password input area comprised in the verification prompt message; or receiving fingerprint information that is inputted, by the target user, in a fingerprint input area comprised in the verification prompt message; or receiving gesture information that is inputted, by the target user, in a gesture input area comprised in the verification prompt message; or receiving human face information that is inputted, by the target user, in a human face input area comprised in the verification prompt message; or receiving speech information that is inputted, by the target user, in a speech input area comprised in the verification prompt message.

14. The computer device according to claim 9, wherein the method comprises:

receiving a private content addition operation for the non-private content displayed in the first screen area, wherein the private content addition operation is set to set an attribute of a selected non-private content to the private content;

adding the selected non-private content into the private content set, so as to obtain updated private content; and responsive to determining that the second screen area is in an unfolded state, displaying the updated private content in the first screen area in a hiding manner, and displaying the updated private content in the second screen area.

15. A non-transitory computer-readable storage medium, having stored thereon a computer program instruction, wherein the computer program instruction, when being executed by a processor, executes a method for displaying content, wherein the method comprises:

receiving a private content display operation for a terminal device, wherein private content of the private content display operation is content, which is added into a set private content set; and in response to the private content display operation, displaying non-private content in a first screen area of the terminal device, and displaying the private content in a second screen area of the terminal device, wherein responsive to determining that the second screen area is in an unfolded state, the receiving the private content display operation for the terminal device comprises:

receiving the private content display operation responsive to determining that the non-private content is displayed in both the first screen area and the second screen area; or receiving the private content display operation responsive to determining that the second screen area is in a blank screen state, wherein the method further comprises: responsive to determining that an authentication of a target user is passed, displaying a corresponding private content in the first screen area and the second screen area together in a non-screen-splitting manner.

16. The non-transitory computer-readable storage medium according to claim 15, wherein responsive to determining that the second screen area is in a folded state, in response to the private content display operation, displaying the non-private content in the first screen area of the terminal device, and displaying the private content in the second screen area of the terminal device comprises:

in response to the private content display operation, controlling the second screen area to unfold; and displaying the non-private content in the first screen area, and displaying the private content in the second screen area.

* * * * *